United States Patent
Itoh et al.

(10) Patent No.: US 8,274,247 B2
(45) Date of Patent: Sep. 25, 2012

(54) ROTARY ELECTRIC MACHINE CONTROL SYSTEM

(75) Inventors: Takeshi Itoh, Nagoya (JP); Takashi Ogawa, Kariya (JP)

(73) Assignee: Denso Corporation, Kariya (JP)

( * ) Notice: Subject to any disclaimer, the term of this patent is extended or adjusted under 35 U.S.C. 154(b) by 450 days.

(21) Appl. No.: 12/566,107

(22) Filed: Sep. 24, 2009

(65) Prior Publication Data

US 2010/0072925 A1 Mar. 25, 2010

(30) Foreign Application Priority Data

Sep. 24, 2008 (JP) ................................. 2008-243633

(51) Int. Cl.
*H02P 21/00* (2006.01)
(52) U.S. Cl. .............. 318/400.02; 318/432; 318/400.09; 318/799
(58) Field of Classification Search .................. 318/432, 318/434, 437, 400.01, 400.02, 727, 799, 318/801, 400.07, 400.09, 400.22, 400.32, 318/721, 779
See application file for complete search history.

(56) References Cited

U.S. PATENT DOCUMENTS

| | | | | |
|---|---|---|---|---|
| 7,592,766 B2 * | 9/2009 | Patel et al. | ............... | 318/400.02 |
| 7,723,945 B2 * | 5/2010 | Okamura | .................. | 318/805 |
| 7,828,093 B2 * | 11/2010 | Hanada et al. | ........... | 180/65.265 |
| 7,893,637 B2 * | 2/2011 | Suhama et al. | ............... | 318/376 |
| 8,018,195 B2 * | 9/2011 | Ohtani et al. | ................. | 318/812 |

FOREIGN PATENT DOCUMENTS

JP 11-299297 10/1999
WO WO 2008/001524 1/2008

OTHER PUBLICATIONS

U.S. Appl. No. 12/566,049, filed Sep. 24, 2009, naming Takeshi Itoh et al, as inventors.
U.S. Appl. No. 12/566,070, filed Sep. 24, 2009, naming Takeshi Itoh et al, as inventors.

* cited by examiner

*Primary Examiner* — Walter Benson
*Assistant Examiner* — Antony M Paul
(74) *Attorney, Agent, or Firm* — Nixon & Vanderhye P.C.

(57) ABSTRACT

A control unit for a rotary electric machine control system includes a first current command module, a second current command module and a change module. The first current command module controls the rotary electric machine based on a maximum efficiency characteristic line. The second current command module controls the rotary electric machine based on an early switching characteristic line, which is set at a retard angle side relative to the maximum efficiency characteristic line with a predetermined phase difference. When a control mode is switched over to a rectangular wave voltage phase control mode from an overmodulation current control mode in accordance with an increase in torque, the change module changes the current command from the first current command module to the second command current module.

16 Claims, 8 Drawing Sheets

ROTARY ELECTRIC MACHINE CONTROL SYSTEM

CROSS REFERENCE TO RELATED APPLICATION

This patent application is based on and incorporates herein by reference Japanese Patent application No. 2008-243633 filed on Sep. 24, 2008.

This patent application is related to co-pending U.S. patent applications arising from Japanese patent applications No. 2008-243648 filed on Sep. 24, 2008 (IPICS 122525-US-KK/nk) and No. 2008-243738 filed on Sep. 24, 2008 (IPICS 122524-US-KK-mik).

FIELD OF THE INVENTION

The present invention relates to a rotary electric machine control system and, more particularly, to a rotary electric machine control system, which switches over a control mode among a sinusoidal wave current control mode, an overmodulation current control mode and a rectangular wave voltage phase control mode.

BACKGROUND OF THE INVENTION

In driving a rotary electric machine by an inverter, a control mode is switched over among a sinusoidal wave current control mode, an overmodulation current control mode and a rectangular wave voltage phase control mode. The rectangular wave voltage phase control mode, which uses one-pulse switching, is required to attain both high output power and size reduction of the rotary electric machine. The rotary electric machine is controlled optimally by switching over the control mode between the sinusoidal wave current control mode, which provides a superior characteristic in a low speed region, and the overmodulation current control mode, which is used in an intermediate rotation speed region.

In the sinusoidal wave current control mode and the overmodulation current control mode, current feedback control is performed to output a pulse-width modulation (PWM) pattern to the rotary electric machine by comparing a command voltage and a carrier wave voltage. In the rectangular wave voltage phase control mode, torque feedback control is performed to output a one-pulse switching waveform to the rotary electric machine in accordance with an electric angle by fixing an amplitude of the voltage to a maximum value and controlling phase.

In the sinusoidal wave current control mode and the overmodulation current control mode, torque control is performed in accordance with a current phase by generating a pseudo-sinusoidal waveform by PWM technology and using a vector control method. Here, in a d-q plane defined by a d-axis and a q-axis used in vector control, a relational equation is defined between a torque T and a current phase $\beta$ between the d-axis current and the q-axis current, and a desired or target torque is produced by varying the current phase $\beta$ in accordance with the defined relational equation.

By assuming that a relational equation derived by differentiating the torque T by the current phase $\beta$ in this relational equation between the current phase $\beta$ and the torque T, a relational equation of the current phase $\beta$ for producing maximum torque can be defined. If the relational equation of the current phase $\beta$ for producing the maximum torque is indicated on the d-q plane, a maximum efficiency characteristic line is determined by connecting current pairs, each of which is a pair of the d-axis current and the q-axis current providing maximum efficiency of the rotary electric machine. In the sinusoidal wave current control mode and the overmodulation current control mode, the rotary electric machine can be driven at the maximum efficiency by performing a current command on the maximum efficiency characteristic line, that is, by driving the rotary electric machine with a command current determined by the maximum efficiency characteristic line.

Control mode switching among the three control modes, that is, switching from the rectangular wave voltage phase control mode to the overmodulation current control mode and switching from the overmodulation current control mode to the rectangular wave voltage phase control mode, is performed in accordance with a rate of modulation or an amplitude of a command voltage corresponding to the modulation rate. The modulation rate is defined as a rate of an amplitude of a signal relative to an output voltage of an inverter.

For example, patent document 1 discloses that, in a control system for a permanent magnet-type synchronous electric motor, interphase basic wave voltages, which are required to control the torque under a condition that an output voltage Ed of the converter (inverter) Ed is constant, are defined as follows:

$Ed \times 6^{1/2}/\pi = 0.78 \times Ed$, when the interphase basic wave voltage is a signal amplitude of a rectangular wave voltage; and $Ed \times 3^{1/2}/2 \times 2^{1/2} = 0.61 = 0.61 \times Ed$, when the interphase basic wave voltage is a signal amplitude of the PWM method performed by comparing a sinusoidal wave and a triangular wave.

Further, patent document 2 discloses that a drive control system for an AC electric motor switches over a control mode as follows:

from a PWM current control mode to an overmodulation control mode, when a voltage amplitude exceeds 1.00 time of a peak value of a reference triangular wave;

from the PWM current control mode to a rectangular wave voltage phase control mode, when the voltage amplitude exceeds 1.27 times of the peak value of the reference triangular wave; and from the rectangular wave voltage phase control mode to the overmodulation control mode, when an absolute value of a phase of an actual current becomes less than an absolute value of a phase of a command current.

Patent document 1: JP 11-299297A
Patent document 2: JP 2008-11682A (WO 2008/001524A1)

According to the PWM technology, the rotary electric machine can be driven to produce its torque at the maximum efficiency by controlling the command current on the maximum efficiency characteristic line. As disclosed in patent document 1, the modulation rate is 0.61 in the case of performing the PWM method by comparing the sinusoidal wave and the triangular wave. The modulation rate is 0.78 in the case of using the rectangular wave as the signal amplitude. For this reason, it is more appropriate to perform the rectangular wave voltage phase control, which can increase the modulation rate.

This means that, although the command current determined in accordance with the maximum efficiency characteristic line can drive the rotary electric machine at the maximum efficiency, it is not necessarily most efficient when an entire rotary electric machine system including the inverter is considered.

SUMMARY OF THE INVENTION

It is therefore an object of the present invention to provide a control system, which enhances efficiency of an entire system including a rotary electric machine and an inverter.

According to one aspect of the present invention, a rotary electric machine control system is provided to switch over a control mode of a rotary electric machine among a sinusoidal wave current control mode, an overmodulation current control mode and a rectangular voltage phase control mode. The rotary electric control system performs a first current command on a maximum efficiency characteristic line formed on a d-q plane defined by a d-axis and a q-axis, which are orthogonal to each other, by connecting each current pair of a d-axis current and a q-axis current, by which the rotary electric machine is driven at a maximum efficiency. The rotary electric machine control system performs a second current command on an early switching characteristic line, by which the control mode is switchable at earlier time than switching over by the maximum efficiency characteristic line in switching over the control mode from the overmodulation current control mode to the rectangular voltage phase control mode in a course of increasing torque, the early switching characteristic line being so set that an operation point of the rotary electric machine has a predetermined phase difference at a retard angle side from the maximum efficiency characteristic line on the d-q plane. The rotary electric machine control system changes a current command from the first current command to the second current command in the course of increasing torque.

BRIEF DESCRIPTION OF THE DRAWINGS

The foregoing and other objects, features and advantages of the present invention will become more apparent from the following detailed description made with reference to the accompanying drawings. In the drawings.

DETAILED DESCRIPTION OF THE PREFERRED EMBODIMENT

The present invention will be described in detail with reference to one exemplary embodiment of a rotary electric machine control system, in which a rotary electric machine is mounted in a vehicle. This control system may be applied to any other rotary electric machines, which are controlled by switching over control modes among a sinusoidal wave current control mode, an overmodulation current control mode and a rectangular wave voltage phase control mode. Although this control system controls two motor-generators, each of which has a motor function and a generator function, it may control one rotary electric machine having only a motor function and one rotary electric machine having only a generator function. Further, it may control only one motor-generator or three or more motor-generators.

Figure 1:
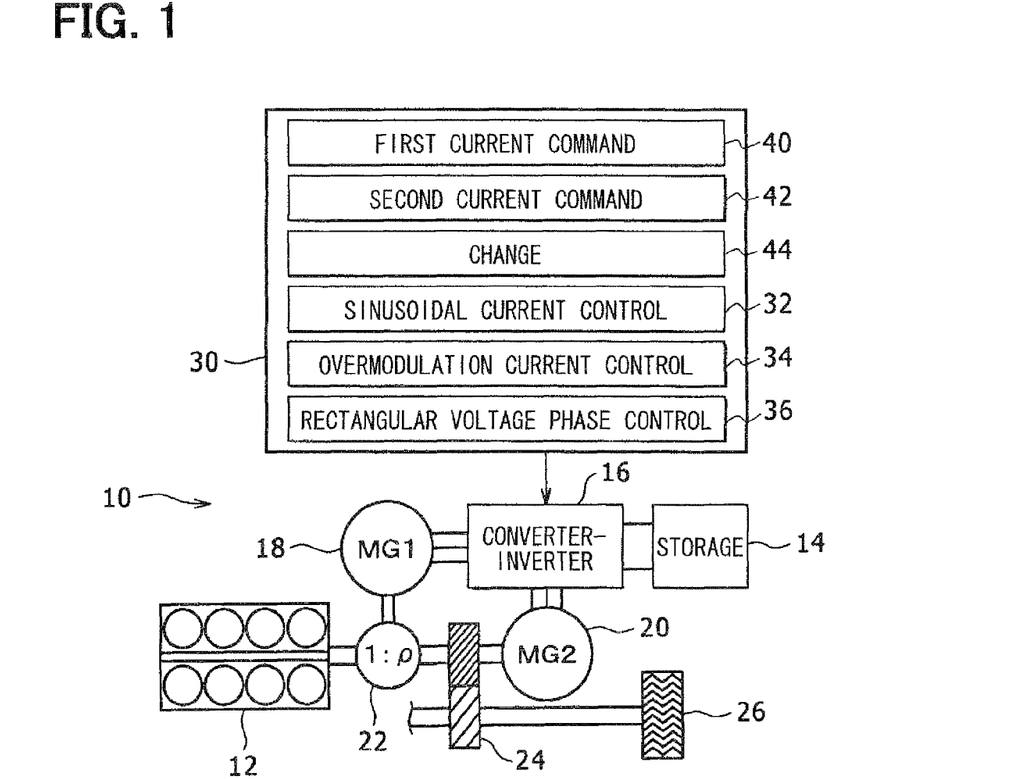
FIG. 1 is a schematic diagram showing an embodiment of a rotary electric machine control system according to the present invention.

Referring first to FIG. 1, a rotary electric machine control system 10 is provided for a rotary electric machine provided in a hybrid vehicle.

The vehicle has an engine 12 and an electric storage device (battery) 14, which are provided as drive power sources, a first rotary electric machine (MG1) 18 and a second rotary electric machine (MG2) 20. The vehicle further has an electric power circuit 16, a drive power distribution mechanism 22, a transmission 24, drive wheels (tire wheels) 26 and an electronic control unit 30.

The power circuit 16 is a converter-inverter connected between the storage device 14 and the two rotary electric machines 18, 20. The power distribution mechanism 22 is for distributing driver power among the engine 12, the first rotary electric machine 18 and the second rotary electric machine 20. The transmission 24 is provided between the drive power distribution mechanism 22 and the second rotary electric machine 20. The drive wheels 26 receive drive power from the transmission 24. The control unit 30 is configured to control respective operations of these automotive parts and components.

The rotary electric machine control system 10 is primarily formed by the rotary electric machines 18, 20, the power circuit 16 and the control unit 30. The other parts and components are assembled in the similar manner as in conventional hybrid vehicles.

Each of the first rotary electric machine 18 and the second rotary electric machine 20 is a motor-generator (MG) and mounted in the vehicle. The motor-generator is a three-phase synchronous rotary machine, which operates as an electric motor when electric power is supplied from the storage device 14 and operates as an electric power generator when it is driven by the engine 12 or the vehicle is braked.

The first rotary electric machine 18 is used as the generator by being driven by the engine 12 to supply generated electric power to the storage device 14 through the converter-inverter of the power circuit 16. The second rotary electric machine 20 is used to drive the vehicle. It operates as the motor and drives the drive wheels 26 of the vehicle during a power running period by receiving electric AC power to which an electric DC power of the storage device 14 is converted by the converter-inverter of the power circuit 16. It also operates as the generator and restores regenerative energy to the storage device 14 through the converter-inverter of the power circuit 16 during a braking period of the vehicle.

The power circuit 16 is provided between the storage device 14 and the two rotary electric machines 18 and 20 as described above, and includes smoothing capacitors and the like in addition to the converter and the inverter.

The converter of the power circuit 16 is provided between the storage device 14 and the inverter and has a voltage conversion function. The converter may be configured to include a reactor and a switching element, which operates under control of the control unit 30. The voltage conversion function includes a step-up function and a step-down function. By the step-up function, a voltage at the storage device side is boosted by using the energy storing operation of the reactor function and supplied to the inverter side. By the step-down function, power from the inverter side is reduced and supplied to the storage device side as electric charge power. The converter may be referred to as a booster circuit when operating to perform the step-up function.

The inverter of the power circuit 16 is provided for converting power between AC power and DC power. The inverter includes a plurality of switching elements, which operate under control of the control unit 30. Since the first rotary electric machine 18 and the second rotary electric machine 20 are used for different purposes and operate at different operation points from each other, the inverter includes two (first and second) inverter circuits. The first inverter circuit is for the first rotary electric machine 18 and the second inverter circuit is for the second rotary electric machine 20.

When the first rotary electric machine 18 is operated as the generator, the first inverter circuit performs an AC-DC conversion function thereby to convert the AC three-phase regenerative power from the first rotary electric machine 18 to the DC power and supply the DC power as the charge current to the storage device 14. When the vehicle is in power running, the second inverter circuit for the second rotary electric machine 20 performs a DC-AC conversion function thereby to convert the DC power from the storage device 14 to the AC three-phase drive power and supply the AC drive power to the second rotary electric machine 20. When the vehicle is in braking, the second inverter circuit performs an AC-DC conversion function thereby to convert the AC three-phase regenerative power from the second rotary electric machine 20 to the DC power and supply the DC power as the charge current to the storage device 14.

The control unit 30 is configured to perform a variety of control functions, which include, for example, control of operation of the engine 12, control of operations of the two rotary electric machines 18, 20, control of operation of the power circuit 16, control of operation of the drive power distribution mechanism 22 and control of operation of the transmission 24.

The control unit 30 is configured by a computer, for example, which is suited for mounting in the vehicle. The control operation may be performed by only one computer, or may be shared by a plurality of computers from the standpoint that the control objects are controlled at different control processing speeds. For example, the operation of the engine 12 is controlled by one computer (engine ECU), the operations of the two rotary electric machines 18, 20 are controlled by one computer (motor-generator ECU), the operation of the power circuit 16 is controlled by one computer (power ECU), and the entire operation of the system is controlled by one computer (management ECU).

The control unit 30 is shown as including functions, as a part of a variety of rotary electric machine control functions, which increase efficiency of an entire rotary electric machine system including the rotary electric machines 18, 20 and the power circuit 16, which includes the converter and the inverter. Specifically, the control unit 30 is configured to include a sinusoidal wave current control module 32 for performing a sinusoidal wave current control mode, an overmodulation current control module 34 for performing an overmodulation current control mode and a rectangular wave voltage phase control module 36 for performing a rectangular wave voltage phase control mode with respect to the rotary electric machines 18, 20.

To enhance the efficiency of entirety of the rotary electric machine system, the control unit 30 is configured to further include a first current command module 40, a second current command module 42 and a change module 44.

The first module 40 has a function of performing a first current command on a maximum efficiency characteristic line defined by connecting current pairs on a d-q plane defined by a d-axis and a q-axis, which are orthogonal to each other. Each of the current pairs is a combination of a d-axis current and a q-axis current, by which the rotary electric machine can be driven at a maximum efficiency. Performing the first current command means determination of a first command current (first current command value) in accordance with the maximum efficiency characteristic line. The d-axis, the q-axis and the d-q plane are described below.

The second module 42 has a function of performing a second current command on an early switching characteristic line, by which the control mode can be switched over at earlier time than by the maximum efficiency characteristic line, in the case of switching over the control mode from the overmodulation current control mode to the rectangular wave voltage phase control mode when the torque is increased. The early switching characteristic line is so set that the operation point of a rotary electric machine is retarded in angle by a predetermined phase difference from the maximum efficiency characteristic line on the d-q plane. Performing the second current command means determination of a second command current (second current command value) to perform the earlier switching.

The change module 44 has a function of changing the current command from the first current command to the second current command, in the course of increasing torque.

These functions are realized by performing software (computer programs), specifically by performing a control mode switching part in a rotary electric machine control program. These functions may be realized partly by hardware (discrete electronic circuits).

The operation of the embodiment will be described below with particular reference to the control functions of the control unit 30. It is noted that the switching-over of the control mode is described with respect to the second rotary electric machine 20 as an example, because both the first rotary electric machine 18 and the second rotary electric machine 20 are controlled in the similar manner.

First, the sinusoidal wave current control mode, overmodulation current control mode and the rectangular wave voltage phase control mode are described.

The sinusoidal control mode and the overmodulation current control mode are a current feedback mode, in which the second rotary electric machine 20 is controlled in a pulse-width modulation pattern determined by comparing the command voltage and the carrier wave voltage. The rectangular control mode is a control mode, in which the one pulse switching waveform is outputted to the second rotary electric machine 20 in accordance with the electric angle while fixing the voltage amplitude to a maximum value. In this mode, torque is feedback-controlled by fixing the voltage amplitude to a maximum value and varying the phase. These three control modes are performed by the sinusoidal wave current control module 32, the overmodulation current control module 34 and the rectangular wave voltage phase control module 36, respectively.

The switching of the mode among the sinusoidal wave current control mode, the overmodulation current control mode and the rectangular wave voltage phase control mode is performed in accordance with a rate of modulation or a command voltage amplitude corresponding to the modulation rate. The modulation rate is a ratio of a signal amplitude relative to an output voltage of the inverter. In the case of pulse-width modulation (PWM) performed by the comparison of the sinusoidal wave and the triangular wave, the modulation rate is $3^{1/2}/(2 \times 2^{1/2})=0.61$. If the rectangular wave is used as the signal amplitude, the modulation rate is $6^{1/2}/\pi=0.78$.

For this reason, the rectangular wave voltage phase control, which can increase the modulation rate, is preferred so that the second rotary electric machine 20 provides higher outputs. In the sinusoidal wave current control mode and the overmodulation current control mode, a pseudo sinusoidal wave formed by PWM technology is used. As a result, the response speed can be increased to be higher than the rectangular wave voltage phase control mode. For those reasons, the sinusoidal wave current control mode, the overmodulation current control mode and the rectangular wave voltage phase control mode are preferably used in a low speed region, an intermediate speed region and a high speed region, respectively.

Figure 2:
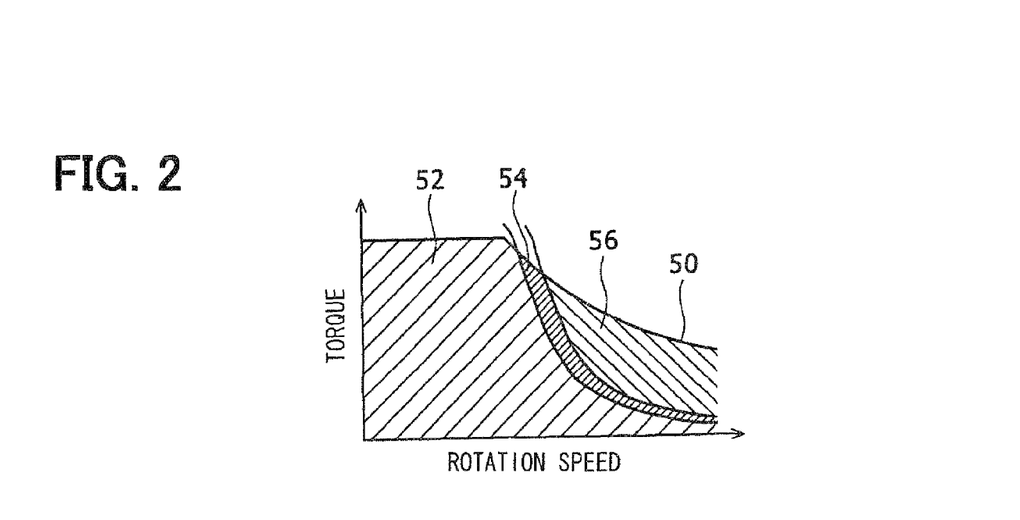
FIG. 2 is a graph showing control modes selected in accordance with operation points of the rotary electric machine.

The control modes, which are switched over in accordance with the operation point of the rotary electric machine, are shown in FIG. 2. In FIG. 2, the abscissa and the ordinate indicate the rotation speed and the torque of the rotary electric machine 20, respectively. A maximum torque characteristic is indicated by a line 50. The operation regions of the sinusoidal wave current control mode at lower speeds, the overmodulation current control mode at intermediate speeds, and the rectangular wave voltage phase control mode at higher speeds are indicated by numerals 52, 54 and 56, respectively.

Figure 3:
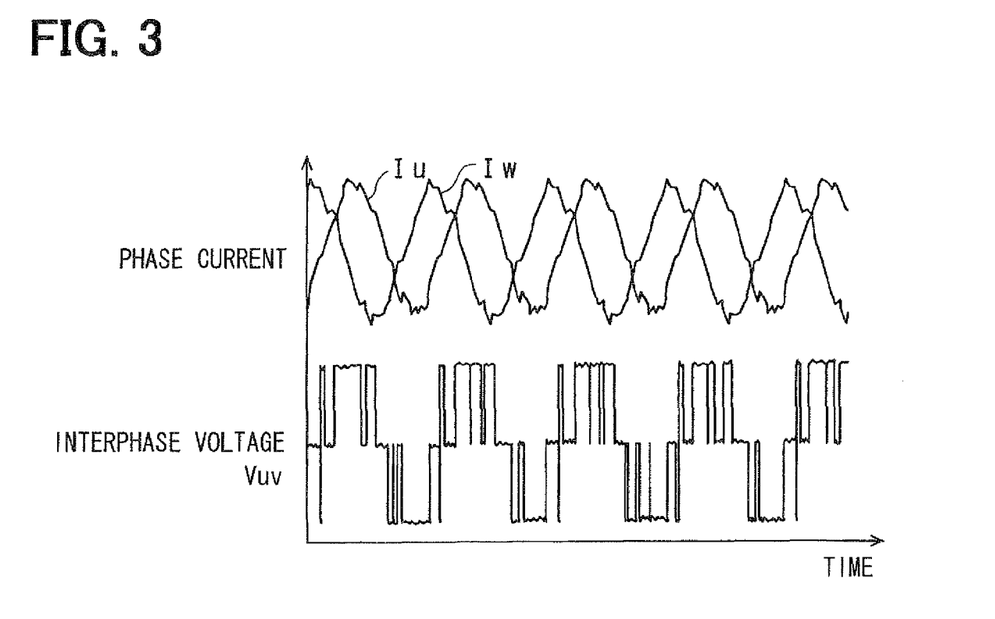
FIG. 3 is a timing diagram showing waveforms of phase currents and interphase voltages in a sinusoidal wave current control mode.
Figure 4:
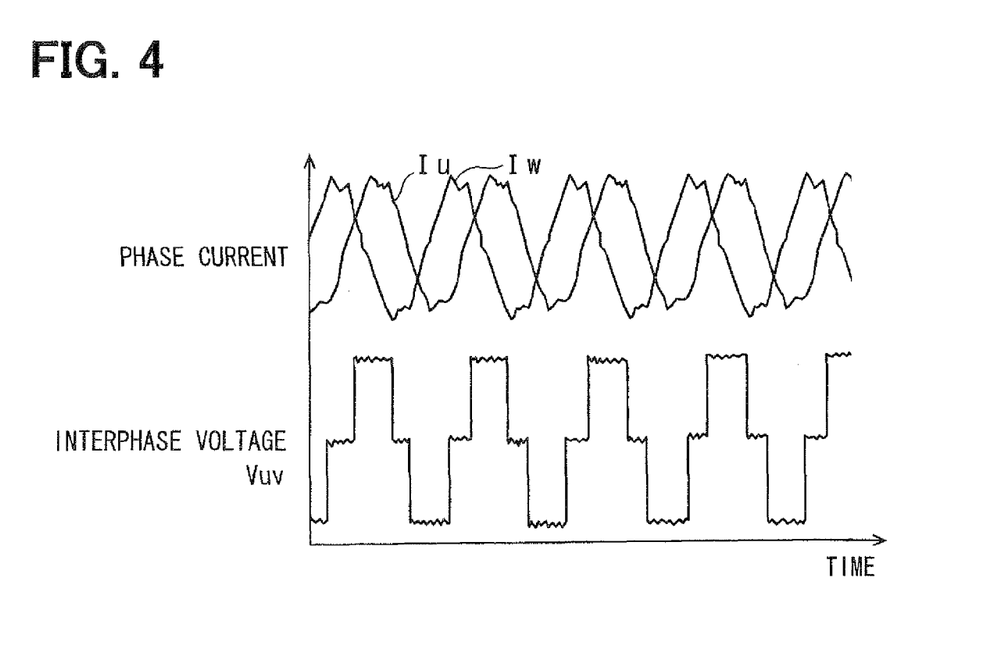
FIG. 4 is a timing diagram showing waveforms of the phase currents and the interphase voltages in an overmodulation current control mode.

Phase current waveforms and interphase voltage waveforms in the overmodulation current control mode and the rectangular wave voltage phase control mode are shown in FIGS. 3 and 4, respectively. In FIGS. 3 and 4, the abscissa indicates time and the ordinate indicates current and voltage of the rotary electric machine 20. As shown in FIG. 3, in the overmodulation current control mode, the interphase voltage waveform is a series of pulses, which are pulse-width modulated, and the phase current waveform is a pseudo-sinusoidal waveform formed by PWM technology. As shown in FIG. 4, in the rectangular wave voltage phase control mode, the phase voltage has a rectangular waveform, which is influenced by the voltage phase control.

Thus, both current waveform and voltage waveform in the rectangular wave voltage phase control mode (FIG. 4) are more stable than those in the overmodulation current control mode (FIG. 3). In the PWM technology, it is necessary to fix a relation between the electric period and the number of pulses. However, synchronization may not be attained, because variation in the rotation speed is estimated. In the overmodulation current control mode, in particular, this tendency becomes more remarkable because of higher torque and higher rotation speed than in the sinusoidal wave current control mode. It is therefore desired to shorten a period of the overmodulation current control mode from the standpoint of stabilizing control signals when the control mode is switched over from the sinusoidal wave current control mode to the overmodulation current control mode and from the overmodulation current mode to the rectangular wave voltage phase control mode.

The control mode is switched over among the three control modes as follows. As shown in FIG. 2, the control mode is switched over in accordance with the operation point defined by the rotation speed and the torque of the rotary electric machine 20. As the rotation speed and the torque increase, the control mode is switched over from the sinusoidal wave current control mode (region 52) to the overmodulation current control mode (region 54) and from the overmodulation current control mode (region 54) to the rectangular wave voltage phase control mode (region 56). In this instance, the control mode is switched over based on the modulation rate. Specifically, the sinusoidal wave current control mode, the overmodulation current control mode and the rectangular wave voltage phase control mode is performed, when the modulation rate is less than 0.61, between 0.61 and 0.78 and more than 0.78, respectively.

Figure 5:
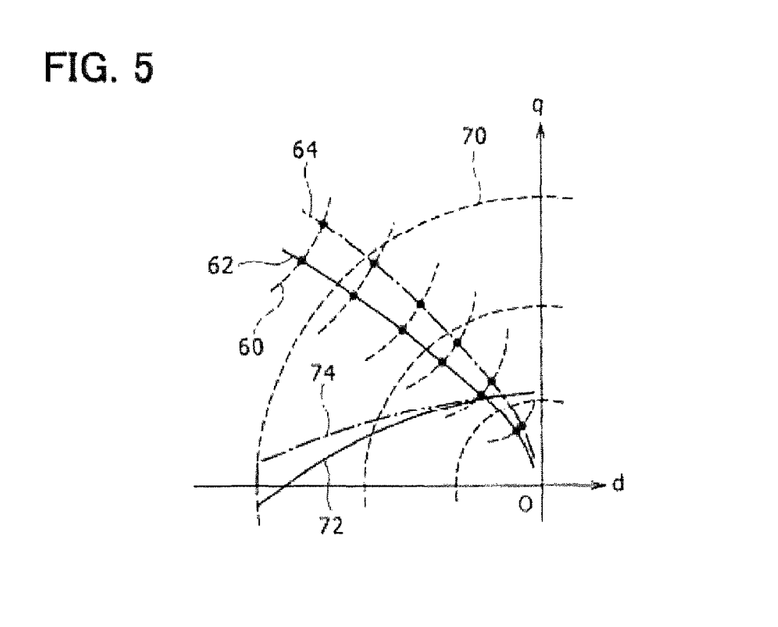
FIG. 5 is graph showing a switching line used to determine a switching time point in accordance with a phase of an actual current relative to a command current in the embodiment.

FIG. 5 shows switching lines used to determine switching time points based on a phase of an actual current relative to a command current. Here, a d-q plane is defined by a d-axis and a q-axis to be used for vector control of the rotary electric machine 20. In the vector control of the three-phase synchronous electric motor of rotary magnetic field, the direction of magnetic flux generated by a magnetic pole of a rotor is defined in the d-axis, and the q-axis is defined in the orthogonal direction to the d-axis. The d-q plane is thus formed by the d-axis and the q-axis as two coordinate axes, which are orthogonal to each other.

A rotary electric machine is expressed mathematically as follows in theory, by using a d-axis inductance Ld, a q-axis inductance Lq, a winding resistance R, an electric angular velocity ω, a counter-electromotive force ψ, a d-axis current Id, a q-axis current Iq, a d-axis voltage Vd and a q-axis voltage Vq of the rotary electric machine.

$$Vd = R \times Id - \omega \times Lq \times Iq$$

$$Vq = R \times Iq + \omega \times Ld \times Id + \omega \times \psi$$

Further, torque T is expressed as follows by assuming that the number of poles of the rotary electric machine is p.

$$T = p \times \psi \times Iq + p \times (Ld - Lq) \times Id \times Iq$$

It is assumed that an absolute value Ia of a current vector, which is defined by the d-axis current Id and the q-axis current Iq, and a current phase β are expressed as follows.

$$Ia = (Id^2 + Iq^2)^{1/2}$$

$$\beta = \tan^{-1}(Iq/Id)$$

Then, the torque T is expressed as follows.

$$T = p \times \psi \times Ia \times \sin \beta + (1/2) \times p \times (Ld - Lq) \times Ia^2 \times \sin 2\beta$$

It is understood from this expression that the torque T is controllable by the current phase β. That is, the current phase indicates a phase between a d-axis current component and a q-axis current component in the current.

Thus, the torque of the rotary electric machine 20 can be controlled by controlling the current phase β. The current phase β that provides a maximum torque can be determined by differentiating the equation of the torque T by the current phase β and applying zero thereto. That is, the current phase β at the maximum torque is expressed as follows.

$$\beta = \cos^{-1}[[-\psi + \{\psi^2 - 8 \times (Ld-Lq)^2\}^{1/2}]/4 \times (Ld-Lq) \times Ia]$$

The characteristic line, which enables the rotary electric machine 20 to be driven at the maximum efficiency, can be determined by adding certain appropriate corrections to the equation determined as above.

A maximum efficiency characteristic line 62, which is determined as above, is shown in FIG. 5. If the current command is performed on the maximum efficiency characteristic line 62, the rotary electric machine 20 can be driven at the maximum efficiency. The current command performed on the maximum efficiency characteristic line 62 is referred to as the first current command.

This maximum efficiency characteristic line 62 is a characteristic line, which is defined by connecting current pairs. Each current pair is a pair or combination of a d-axis current and a q-axis current, which satisfies the current phase β when the rotary electric machine 20 produces the maximum torque. In FIG. 5, a first voltage command characteristic line 72 is also shown. This characteristic line 72 is defined by connecting voltage pairs, each of which is a combination of a d-axis voltage corresponding to the d-axis current and a q-axis voltage corresponding to the q-axis current.

A maximum voltage supplied to the rotary electric machine 20 is shown by a line 70 as a maximum voltage circle. In the rectangular wave voltage phase control mode, the torque of the rotary electric machine 20 is controlled by controlling the voltage phase on the maximum voltage circle 70 when the amplitude of the rectangular wave voltage is constant. Therefore, the first voltage command characteristic line 72 inside the maximum voltage circle 70 corresponds to the voltage pairs of the d-axis voltage and the q-axis voltage of the voltage command at the maximum efficiency operation in the sinusoidal wave current control mode and the overmodulation current control mode. This voltage command is referred to as a first voltage command in correspondence to the first current command. Performing the first voltage command means determination of a first command voltage (first voltage command value).

By thus using the d-q plane, the maximum efficiency characteristic line 62 is defined, by which the first current command is performed to maximize the efficiency of operation of the rotary electric machine 20 in the sinusoidal wave current control mode and the overmodulation current control mode. Further, the first voltage command characteristic line 72 is defined in correspondence to the maximum efficiency characteristic line 62 so that the first voltage command is performed on the first voltage command characteristic line 72. The command voltage is determined in accordance with the maximum voltage circle 70 in the rectangular wave voltage phase control mode.

In FIG. 5, a plurality of equitorque characteristic lines 60 is shown. Each equitorque characteristic line 60 is similar to a hyperbolic curve on the d-q plane as indicated by the following equation of torque T.

$$T = p \times \psi \times Iq + p \times (Ld-Lq) \times Id \times Iq$$

In FIG. 5, an early switching characteristic line 64 is shown at a retard angle side relative to the maximum efficiency characteristic line 62 on the d-q plane. This early switching characteristic line 64 is so set that the operation point of the rotary electric machine 20 has a predetermined phase difference from the maximum characteristic line 62. Since the early switching characteristic line 64 has the predetermined phase difference in the retard angle side from the maximum efficiency characteristic line 62, the control mode can be switched at an earlier time according to the early switching characteristic line 64 than according to the maximum efficiency characteristic line 62 in switching over the control mode from the overmodulation current control mode to the rectangular wave voltage phase control mode when the torque is increased as described below. Here, the current command performed on the early switching characteristic line 64 is referred to as a second current command. Performing the second current command means determination of a second command current (second current command value).

A second voltage command characteristic line 74 is also shown in FIG. 5. This second command characteristic line 74 is defined by connecting voltage pairs, each of which is a combination of a d-axis voltage and a q-axis voltage corresponding to each pair of the d-axis current and the q-axis current defining the early switching characteristic line 64. The voltage command performed on the second voltage command characteristic line 74 is referred to a second voltage command. Performing the second voltage command means determination of a second command voltage (second voltage command value).

As described above, the d-axis voltage Vd and the q-axis voltage Vq are expressed as follows.

$$Vd = R \times Id - \omega \times Lq \times Iq$$

$$Vq = R \times Iq + \omega \times Ld \times Id + \omega \times \psi$$

Regarding the relation between currents Id, Iq and voltages Vd, Vq, the voltage Vd becomes larger in the opposite polarity as the current Iq becomes larger and the voltage Vq becomes larger in the same polarity as the current Id becomes larger, if the resistance R is small. It is therefore very roughly generalized that the voltage characteristic lines are similar to the current characteristic lines with the d-axis and the q-axis being exchanged. As a result, for example, the maximum efficiency characteristic line 62 and the first voltage command characteristic line 72 become generally orthogonal to each other in FIG. 5.

In the rectangular wave voltage phase control mode, the voltage command is performed on the maximum voltage circle 70, the current command characteristic line corresponding to this voltage command becomes generally orthogonal to the voltage command characteristic line on the maximum voltage circle 70. In the example of FIG. 5, the voltage command in the rectangular wave voltage phase control mode is performed on a part, which is inside the maximum voltage circle 70 and generally orthogonal to the d-axis, the current command corresponding to the voltage command is performed on a characteristic line generally parallel to the d-axis. In this instance, when the torque is increased, the control mode can be switched from the overmodulation current control mode to the rectangular wave voltage phase control mode at a lower torque according to the early switching characteristic line 64, which is set at the retard angle side than the maximum efficiency characteristic line 62 on the d-q plane.

Figure 6:
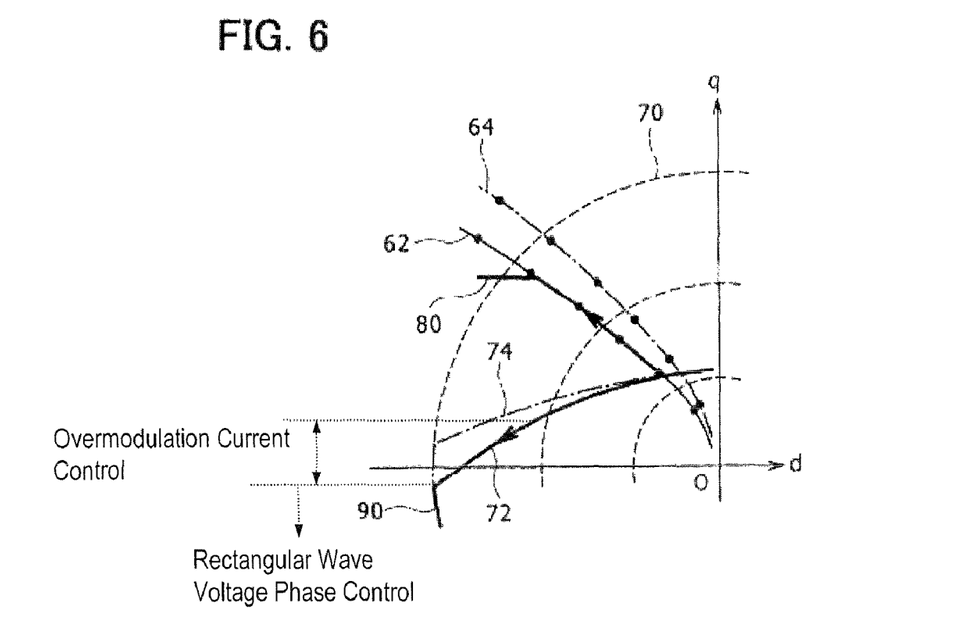
FIG. 6 is a graph showing control mode switching from an overmodulation current control mode to a rectangular voltage phase control mode on a maximum efficiency characteristic line in the embodiment.
Figure 7:
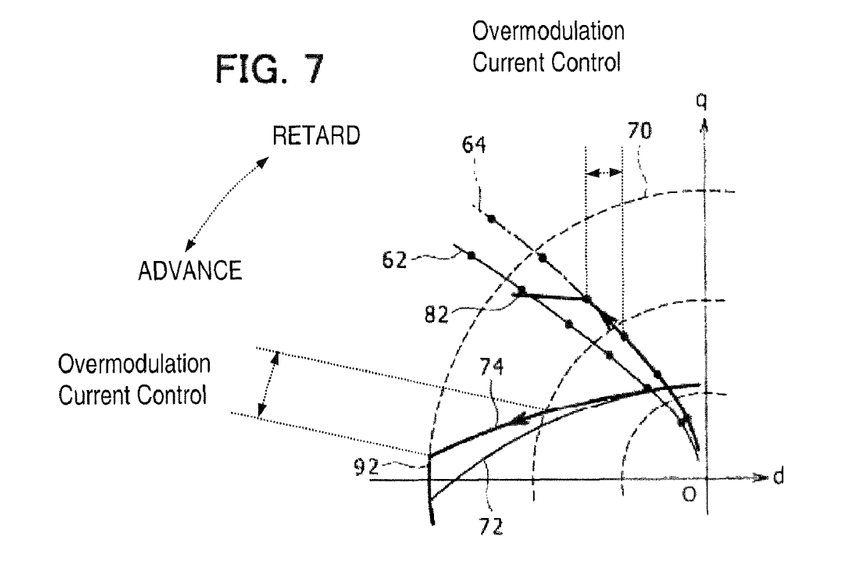
FIG. 7 is a graph showing control mode switching from the overmodulation control mode to the rectangular voltage phase control mode on an early switching characteristic line in the embodiment.

This operation is described in more detail with reference to FIGS. 6 and 7, which also show d-q planes as FIG. 5 does. FIGS. 6 and 7 show cases of switching over from the overmodulation current control mode to the rectangular wave voltage phase control mode in accordance with the maximum efficiency characteristic line 62 and in accordance with the early switching characteristic line 64, respectively. The dots provided closely to each other on the maximum efficiency characteristic line 62 and the early switching characteristic line 64 indicate the same torque points.

In FIG. 6, as shown by a voltage phase trajectory 90, the command voltage changes on the first voltage command characteristic line 72 as indicated by an arrow, and changes on the maximum voltage circle 70 after reaching the maximum voltage circle 70. When the voltage phase trajectory 90 reaches the maximum voltage circle 70, the control mode is switched to the rectangular wave voltage phase control mode.

As shown by a current phase trajectory 80, the command current corresponding to the command voltage changes on the maximum efficiency characteristic line 62 as shown by an arrow, and changes generally in parallel to the d-axis in the example of FIG. 6 from a point, at which the voltage phase trajectory 90 reaches the maximum voltage circle 70.

In FIG. 7, as shown by a voltage phase trajectory 92, the command voltage changes on the second voltage command characteristic line 74 as indicated by an arrow and changes on the maximum voltage circle 70 after reaching the maximum voltage circle 70. When the voltage phase trajectory 92 reaches the maximum voltage circle 70, the control mode is switched to the rectangular wave voltage phase control mode.

As shown by a current phase trajectory 82, the command current corresponding to the command voltage changes on the early switching characteristic line 64 as shown by an arrow, and changes generally in parallel to the d-axis in the example of FIG. 7 from a point, at which the voltage phase trajectory 92 reaches the maximum voltage circle 70.

Since the maximum voltage circle 70 is the same in both cases of FIGS. 6 and 7, the parts of the current phase trajectories 80 and 82, which are generally parallel to the d-axis, are the same characteristic lines. Assuming that this characteristic line extends in parallel to the d-axis, a torque produced at the point where the current phase trajectory 82 changes from the early switching characteristic line 64 to be in parallel to the d-axis is smaller than that produced at the point where the current phase trajectory 80 changes from the maximum efficiency characteristic line 62 to be in parallel to the d-axis. In the examples of FIGS. 6 and 7, the torque at which the control mode is switched over to the rectangular wave voltage phase control mode is smaller in the case of FIG. 7 than in the case of FIG. 6.

By thus performing the current command on the early switching characteristic line 64 provided at the retard angle side relative to the maximum efficiency characteristic line 62, the control mode can be switched over to the rectangular wave voltage phase control mode at a relatively lower torque point, that is, at an earlier time point. As a result, the rectangular wave voltage phase control mode can be performed over wider operation region of the rotary electric machine 20 and the efficiency of the inverter can be increased. However, the early switching characteristic line 64 is set differently from the maximum efficiency characteristic line 62 in respect of current phase. Therefore, the rotary electric machine 20 will have to be operated with more loss in comparison with operation according to the maximum efficiency characteristic line 62.

Figure 8:
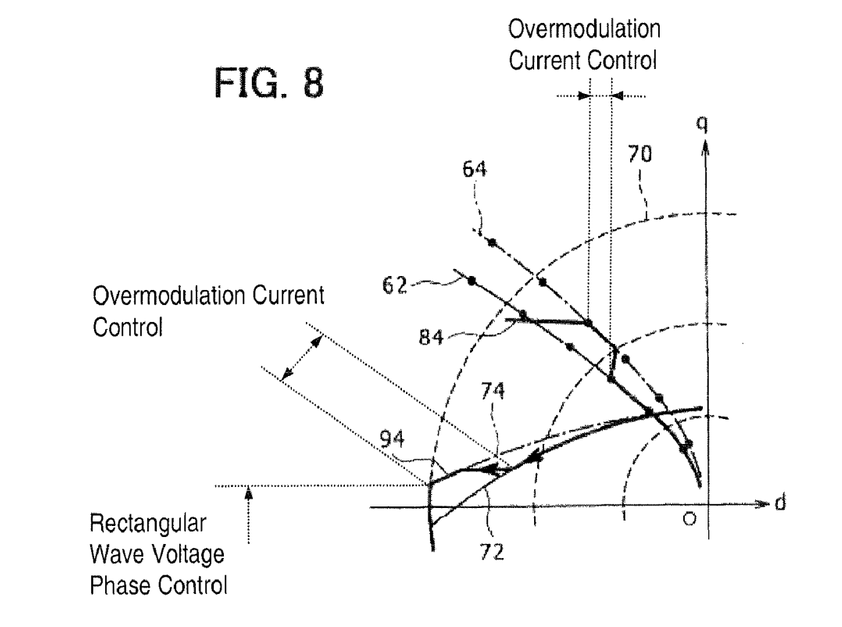
FIG. 8 is a graph showing a method of suppressing loss and maximizing efficiency of an entire system including a rotary electric machine and an electric power source device in the embodiment.

However, the efficiency of the entire rotary electric machine system including the rotary electric machine 20 and the power circuit 16 is maximized by suppressing loss of the entire system as shown in FIG. 8. Here, the first current command is performed first on the maximum efficiency characteristic line 62 to maximize the efficiency of the rotary electric machine 20 when the torque of the rotary electric machine 20 is increased. This processing is performed by the first current command module 40 of the control unit 30 shown in FIG. 1.

At an appropriate time point in the course of further increasing the torque of the rotary electric machine 20, the first current command is changed to the second current command, which is performed on the early switching characteristic line 64. This processing is performed by the change module 44 of the control unit 30. Thereafter, the second current command is performed on the early switching characteristic line 64. This processing is performed by the second current command module 42 of the control unit 30. According to this control, the current command and the voltage command change as indicated by a current phase trajectory 84 and a voltage phase trajectory 94 in FIG. 8.

By switching over the control mode to the rectangular wave voltage phase control mode at the time the characteristic line used for the current command is changed to the early switching characteristic line 64, the operation region of the rotary electric machine 20 to which the rectangular wave voltage phase control mode is applied is enlarged so that the loss of the power circuit 16 including the inverter is reduced to improve the efficiency. By thus changing from the first current command to the second current command at the appropriate time point, the efficiency of the rotary electric machine 20 and the efficiency of the power circuit 16 are both increased so that the efficiency of the entire rotary electric machine is increased.

Figure 9:
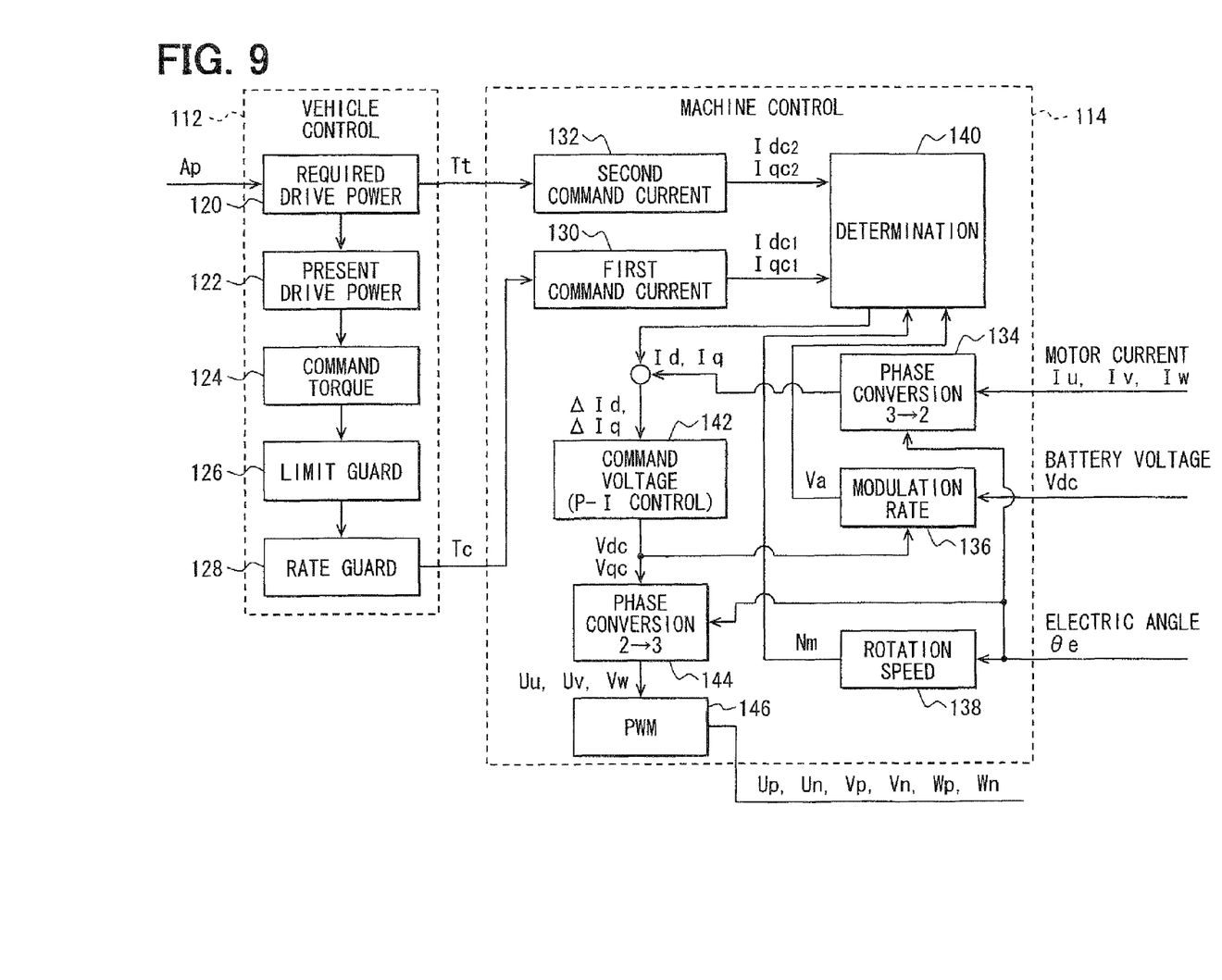
FIG. 9 is a functional block diagram showing details of a control apparatus for a rotary electric machine mounted in a vehicle in the embodiment.

FIG. 9 shows, in the form of functional blocks, a rotary electric machine control apparatus 110 for controlling a rotary electric machine mounted in a vehicle. The control unit 30 shown in FIG. 1 is a part of the control apparatus 110, particularly of a current command determination processing 140.

The control apparatus 110 includes a vehicle control section 112 and a rotary electric machine control section 114. The vehicle control section 112 is primarily for calculating a command torque Tc based on acceleration requirement of a user and the like. The machine control section 114 is primarily for generating control signals for the power circuit 16, which realizes the command torque Tc.

The vehicle control section 112 performs required drive power calculation processing 120 by acquiring an accelerator position of the vehicle and the like to calculate a target torque Tt based on the calculated required drive power, and outputs the calculated target torque Tt to the rotary electric machine control section 114. The vehicle control section 112 further performs vehicle present drive power calculation processing 122 and command torque Tc calculation processing 124, which is based on a difference between the required drive power and the present drive power. The vehicle control section 112 then performs upper and lower limit guard processing 126 on the calculated torque command and rate guard processing 128 for the command torque Tc. The vehicle control section 112 outputs the command torque Tc, which results from the guard processing 126 and 128, to the rotary electric machine control section 114.

The present drive power may be calculated at processing 122 for example by the voltage and the current of the rotary electric machine 20. The upper and lower limit guard processing 126 is for limiting the command torque Tc to an upper limit and a lower limit, which are determined in accordance with travel conditions of the vehicle, specifications of component parts of the rotary electric machine system. The rate guard processing 128 is for limiting a rate of change of the command torque Tc to be within a predetermined range so that the command torque Tc does not change so rapidly with respect to time.

The target torque Tt and the command torque Tc thus calculated are supplied from the vehicle control section 112 to the rotary electric machine control section 114. The machine control section 114 performs first command current calculation processing 130 to calculate the pair of currents Id and Iq in accordance with the command torque Tc. Specifically, a first command current Ic1 is calculated as Idc1 and Iqc1 based on the maximum efficiency characteristic line 62. The machine control section 114 also performs second command current calculation processing 132 to calculate the currents Id and iq in accordance with the target torque Tt. Specifically, a second command current Ic2 is calculated as Idc2 and Iqc2 based on the early switching characteristic line 64, which is set at the retard angle side relative to the maximum efficiency characteristic line 62. The torque output efficiency of the machine 20 is lower when the rotary electric machine 20 is driven according to the early switching characteristic line 64 than when it is driven according to the maximum efficiency line 62. Therefore, the retard angle of the early switching characteristic line 64 relative to the maximum efficiency characteristic line 62 is determined within a range of the target torque Tt in consideration of improvement of efficiency of the power source circuit 26 provided by the enlargement of range of the rectangular wave voltage phase control mode, which is performed after the switching over to the rectangular wave voltage phase control mode.

The machine control section 114 performs three-to-two phase conversion processing 134, modulation rate calculation processing 136 and rotation speed calculation processing 138. The phase conversion processing 134 is for converting three-phase motor currents Iu, Iv and Iw of three phases U, V and W of the rotary electric machine 20 acquired by current sensors to two currents Id and Iq. The modulation rate calculation processing 136 is for calculating the modulation rate Va based on a voltage Vdc and an amplitude of a command voltage Vc calculated by command voltage calculation processing 142. The voltage Vdc is acquired by a voltage sensor of the power circuit 16 and indicates the interphase voltage of the inverter. The rotation speed calculation processing 138 is for calculating a rotation speed Nm of the rotary electric machine 20 based on an electric angle θe acquired by a position sensor provided to detect a rotation position of a rotor of the rotary electric machine 20.

The machine control section 114 performs determination processing 140, which determines either one of performance of the first current command (function of the first current command module 40), change from the first current command to the second current command (function of the change module 44) and performance of the second current command (function of the second current command module 42) in accordance with the first command current Ic1, the second command current Ic2, the modulation rate Va and the rotation speed Nm.

The first command current Ic1 (Idc1 and Iqc1) and the second command current Ic2 (Idc2 and Iqc2) produced from the determination processing 140 are compared with the present currents Id and Iq produced by the phase conversion processing 134. Current differences ΔId and ΔIq, which indicate comparison results of the d-axis current and the q-axis current, are subjected to P-I control and the like in the command voltage calculation processing 142, which produces the command voltage Vc (d-axis voltage Vdc and q-axis voltage Vqc). This command voltage is supplied to two-to-three phase conversion processing 144 as well as the modulation rate processing 136. The command voltages Vdc and Vqc are converted to phase voltages Vu, Vv and Vw of three phases U, V and W of the rotary electric machine 20 and three-phase command voltages are produced in view of the current electric angle θe of the rotary electric machine 20. These command voltages are pulse-width modulated by PWM processing 146 so that inverter control signals for positive(p)-side and negative(n)-side switching elements of each phase U, V and W of the inverter are produced as inverter gate signals Up, Un, Vp. Vn, Wp and Wn.

Changing from the first current command on the maximum efficiency line 62 to the second current command on the early line 64 may be performed as follows.

As the first example, the first current command is changed to the second current command, when the required drive power of the rotary electric machine 20 exceeds the present output drive power of the same as a result of comparison of the two drive powers and the drive voltage, which satisfies the required drive power is in the rectangular wave voltage phase control mode. As the required drive power and the present output drive power, the calculation results of the required drive power calculation processing 120 and the present drive power calculation processing 122 shown in FIG. 9 may be used. As the drive voltage for the rotary electric machine 20, the calculation result of the command voltage calculation processing 142 may be used. It is possible to check whether the drive voltage of the rotary electric machine 20 is in the region of the rectangular wave voltage phase control mode by comparison of the calculation result of the modulation rate calculation processing 136 with a predetermined modulation rate, for example 0.78, corresponding to the rectangular wave voltage phase control mode.

As the second example, the first current command is changed to the second current command, when the second command voltage exceeds the first command voltage as a result of comparison of the two command voltages. The first command voltage corresponds to the first command current determined based on the maximum efficiency characteristic line 62. The second command voltage corresponds to the second command current determined based on the early switching characteristic line 64. The first command voltage and the second command voltage may be calculated by using the equations of the d-axis voltage and the q-axis voltage, which are described as the theoretical expression of a rotary electric machine, by using the d-axis command current and the q-axis command current, which are calculation results of the first command current calculation processing 130 and the second command current calculation processing 132.

Figure 10:
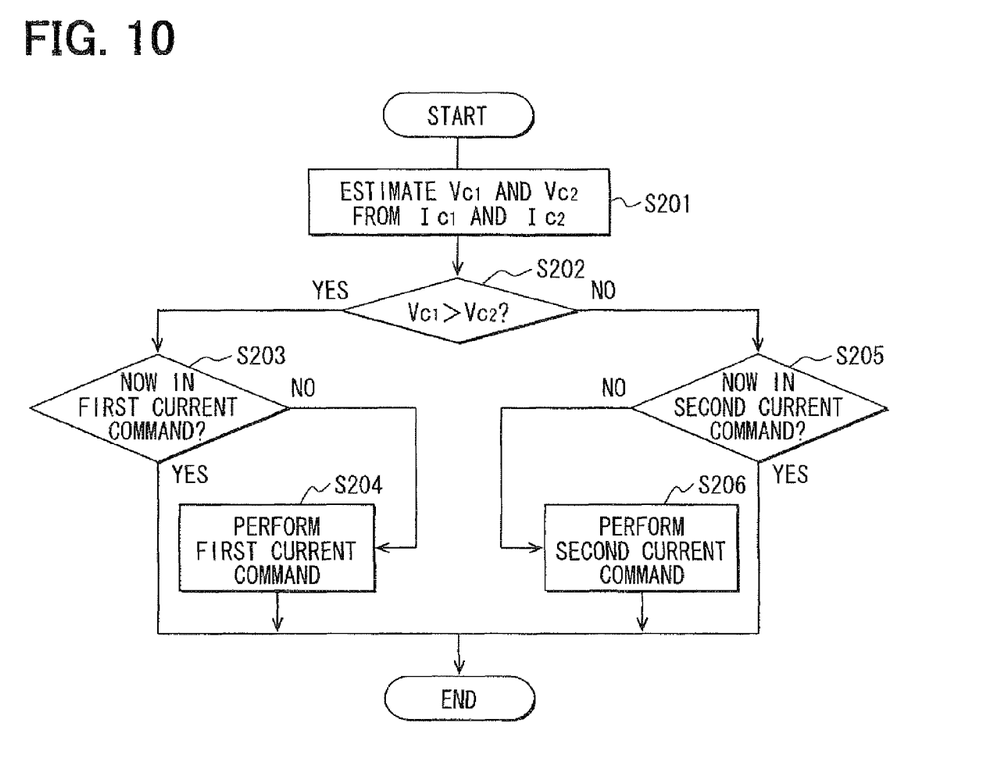
FIG. 10 is a flowchart showing processing executed to switch from a first command current to a second command current when a second command voltage exceeds a first command voltage in the embodiment.

This second example is shown in FIG. 10, by which the first command current is changed to the second command current when the second command voltage exceeds the first command voltage. In this example, the first command voltage Vc1 and the second command voltage Vc2 are estimated from the first command current Ic1 and the second command current Ic2, respectively, at S201. The two command voltages are compared at S202. If the first command voltage exceeds the second command voltage (Vc1>Vc2), the first current command is performed at S204 through S203. If the first command voltage does not exceed the second command voltage, the second current command is performed at S206 through S205.

As the third example, the first current command is changed to the second current command in either of the cases, in which the drive voltage of the rotary electric machine 20 exceeds a predetermined drive voltage threshold, the output voltage of the inverter for the rotary electric machine 20 exceeds a predetermined output voltage threshold, and the modulation rate of the inverter output voltage exceeds a predetermined modulation rate. As the drive voltage for the rotary electric machine 20, the output voltage of the inverter and the modulation rate, the calculation result of the command voltage calculation processing 142, the conversion result of the two-to-three phase conversion processing 144 and the calculation result of the modulation rate calculation processing 136 may be used, respectively. The thresholds may be determined in accordance with the efficiency of the entire rotary electric machine system.

Figure 11:
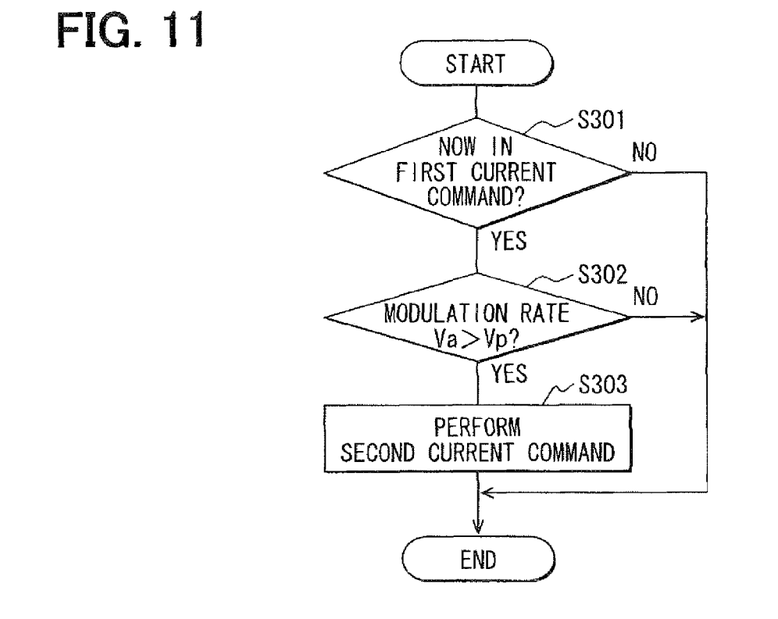
FIG. 11 is a flowchart showing processing executed to switch from the first command current to the second command current when a modulation rate exceeds a threshold of a modulation rate in the embodiment.

The first current command is changed to the second current command when the modulation rate Va exceeds the predetermined modulation rate threshold Vp by S301, S302 and S303 as shown in FIG. 11.

Figure 12:
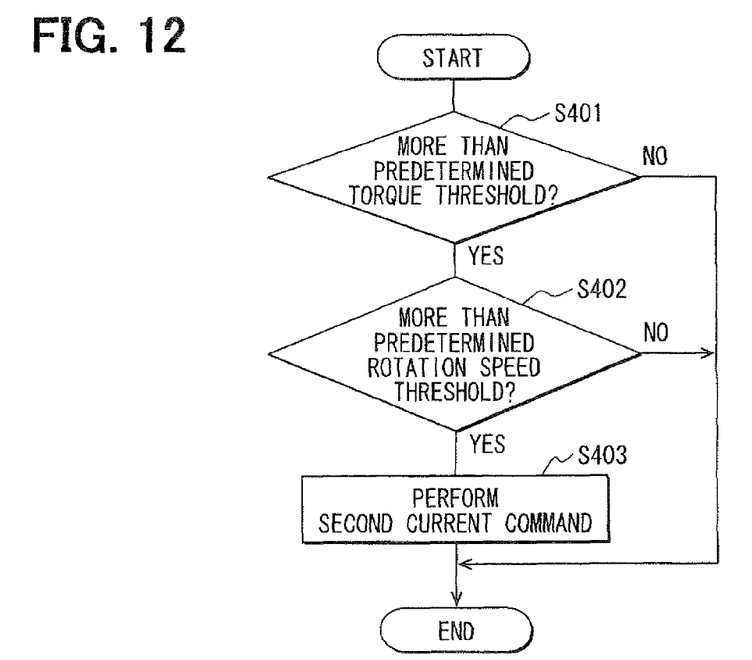
FIG. 12 is a flowchart showing processing of switching from the first command current to the second command current in accordance with torque and rotation speed in the embodiment.

As the fourth example, the first current command is changed to the second current command, when the torque of the rotary electric machine 20 exceeds a predetermined torque threshold and the rotation speed of the rotary electric machine 20 exceeds a predetermined rotation speed threshold. As the torque and the rotation speed of the rotary electric machine 20, the calculation results of the command torque calculation processing 124 and the rotation speed calculation processing 138 shown in FIG. 9 may be used. The thresholds may be determined in accordance with the efficiency of the entire rotary electric machine system. This fourth example may be performed by S401, S402 and S403 as shown in FIG. 12.

As the fifth example, the first current command is changed to the second current command, when the control mode is switched over from the sinusoidal wave current control mode to the overmodulation current control mode under a predetermined switching condition. The predetermined switching condition may be a modulation rate, which is more than 0.61 or more than a certain value predetermined to be between 0.61 and 0.78.

Figure 13:
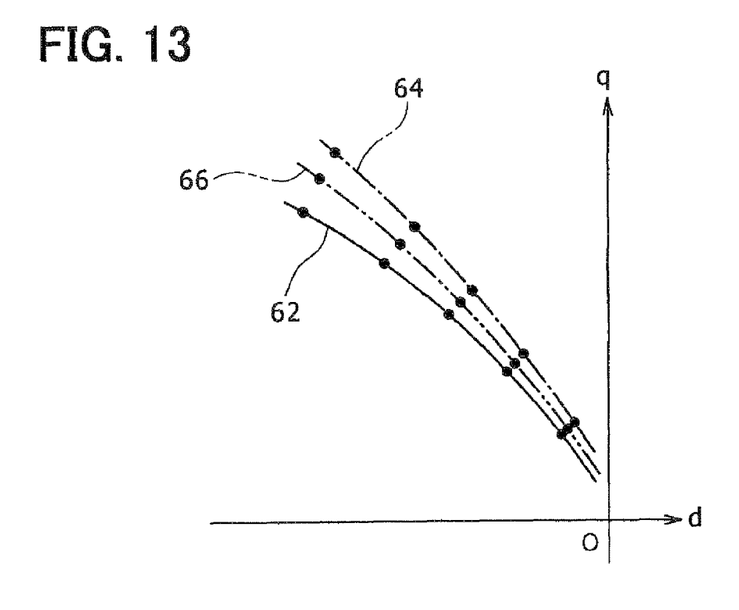
FIG. 13 is a graph showing a method of setting an intermediate characteristic line in the embodiment.

As the sixth example, the first current command is changed to the second current command through a third current command by providing an intermediate characteristic line 66 at the retard angle side relative to the maximum efficiency characteristic line 62 and at the advance angle side relative to the early switching characteristic line 64 on the d-q plane.

Specifically, as shown in FIG. 13, the intermediate characteristic line 66 is set between the maximum efficiency characteristic line 62 and the early switching characteristic line 64 on the d-q plane. Since the current command is changed from the first current command to the second current command through the intermediate characteristic line 66, the currents and the voltages of the rotary electric machine are restricted from overshooting and undershooting at the time of changing.

Figure 14:
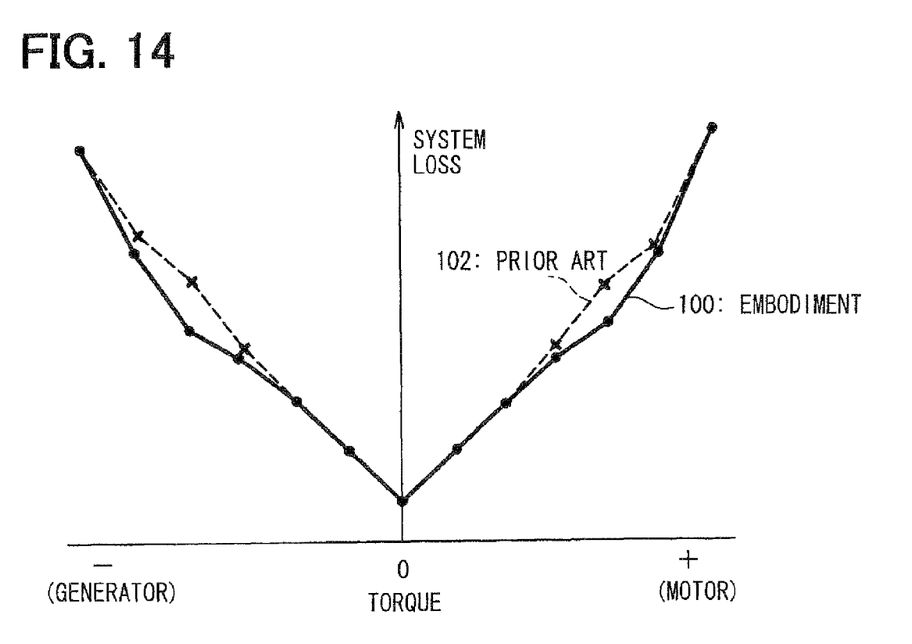
FIG. 14 is a graph showing an advantage of the embodiment in comparison with a prior art system.

Result of comparison of the embodiment with the prior art system is shown in FIG. 14, in which the abscissa indicates output torque of the rotary electric machine 20 and the ordinate indicates system loss of the entire rotary electric machine system including both the rotary electric machine 20 and the power circuit 16. The positive torque indicates a case, in which the rotary electric machine 20 operates as an electric motor. The negative torque indicates a case, in which the rotary electric machine 20 operates as an electric generator or restores regenerative energy.

In FIG. 14, a characteristic line 100 indicated by a solid line represents system loss according to the embodiment, in which the rectangular wave voltage phase control mode is enlarged by the use of the early switching characteristic line 64 in addition to the maximum efficiency characteristic line 62. A characteristic line 102 indicated by a dotted line represents system loss according to the prior art system, in which the rectangular mode is performed by the use of only the maximum efficiency characteristic line 62.

As described with reference to FIG. 2, the control mode is switched over from the sinusoidal wave current control mode to the rectangular wave voltage phase control mode through the overmodulation current control mode, as the torque is increased from zero. As understood from FIG. 10, the system loss in the prior art system indicated by the characteristic line 102 tends to increase in an intermediate torque region, which generally corresponds to or is close to the overmodulation current control mode. According to the embodiment, however, since the range of the rectangular wave voltage phase control mode is enlarged and the range of the overmodulation current control mode is narrowed by the use of the early switching characteristic line 64, the system loss is reduced in and near the range of the overmodulation current control mode as shown by the characteristic line 100.

What is claimed is:

1. A rotary electric machine control system, which switches over a control mode of a rotary electric machine from a sinusoidal wave current control mode to an overmodulation current control mode and from the overmodulation current control mode to a rectangular voltage phase control mode, the rotary electric control system comprising:
    first current command means for performing a first current command in the sinusoidal wave current control mode or the overmodulation current control mode by using a d-axis current and a q-axis current defined by a maximum efficiency characteristic line formed on a d-q plane defined by a d-axis and a q-axis, which are orthogonal to each other, by connecting each current pair of a d-axis current and a q-axis current, by which the rotary electric machine is driven at a maximum efficiency;
    second current command means for performing a second current command in the overmodulation current control mode by using the pair of the d-axis current and the q-axis current defined by an early switching characteristic line different from the maximum efficiency characteristic line on the d-q plane until the control mode is switched to the rectangular wave voltage phase control mode, the early switching characteristic line being set at a q-axis side relative to the maximum efficiency characteristic line by connecting current pairs of a d-axis current and a q-axis current; and
    change means for changing a current command from the first current command to the second current command in a course of switching over the control mode from the sinusoidal wave current control mode to the rectangular wave voltage control mode through the overmodulation current control mode.

2. The rotary electric machine control system according to claim 1, wherein:
    the change means is configured to compare a required drive power of the rotary electric machine and an output drive power presently produced by the rotary electric machine, and change the current command from the first current command to the second current command when the required drive power exceeds the output drive power and a drive voltage for the required drive power is in a region of the rectangular wave voltage phase control mode.

3. The rotary electric machine control system according to claim 1, wherein:
    the change means is configured to compare a first command voltage and a second command voltage, and change the current command from the first current command to the second current command when the second command voltage becomes exceeds the first command voltage, the first command voltage corresponding to a command current produced in performing the first current command and the second command current corresponding to a command current calculated from a command torque, which is based on the required drive power, in performing the second current command.

4. The rotary electric machine control system according to claim 1, wherein:
the change means is configured to change the current command from the first current command to the second current command in any one of cases, in which a drive voltage of the rotary electric machine exceeds a predetermined drive voltage threshold, an output voltage of an inverter for driving the rotary electric machine exceeds a predetermined output voltage threshold, and a modulation rate of the output voltage of the inverter exceeds a predetermined modulation rate threshold.

5. The rotary electric machine control system according to claim 1, wherein:
the change means is configured to change the current command from the first current command to the second current command, when a torque of the rotary electric machine exceeds a predetermined torque threshold and a rotation speed of the rotary electric machine exceeds a rotation speed threshold.

6. The rotary electric machine control system according to claim 1, wherein:
the change means is configured to change the current command from the first current command to the second current command, when the control mode is switched over from the sinusoidal wave current control mode to the overmodulation current control mode under a predetermined switching condition.

7. The rotary electric machine control system according to claim 1, further comprising:
third current command means for performing a third current command on an intermediate characteristic line predetermined to be between the maximum efficiency characteristic line and the early switching characteristic line on the d-q plane,
wherein the change means is configured to change the current command from the first current command to the second current command through the third current command.

8. The rotary electric machine control system according to claim 1, wherein:
the d-q plane is provided for a vector control of the rotary electric machine.

9. A method of controlling a rotary electric machine, which has a control mode which is switchable from a sinusoidal wave current control mode to an overmodulation current control mode and from the overmodulation current control mode to a rectangular voltage phase control mode, the method comprising:
performing a first current command in the sinusoidal wave current control mode or the overmodulation current control mode by using a d-axis current and a q-axis current defined by a maximum efficiency characteristic line formed on a d-q plane defined by a d-axis and a q-axis, which are orthogonal to each other, by connecting each current pair of a d-axis current and a q-axis current, by which the rotary electric machine is driven at a maximum efficiency;
performing a second current command in the overmodulation current control mode by using the pair of the d-axis current and the q-axis current defined by an early switching characteristic line different from the maximum efficiency characteristic line on the d-q plane until the control mode is switched to the rectangular wave voltage phase control mode, the early switching characteristic line being set at a q-axis side relative to the maximum efficiency characteristic line by connecting current pairs of a d-axis current and a q-axis current; and
changing a current command from the first current command to the second current command in a course of switching over the control mode from the sinusoidal wave current control mode to the rectangular wave voltage control mode through the overmodulation current control mode.

10. The method according to claim 9, wherein:
a required drive power of the rotary electric machine and an output drive power presently produced by the rotary electric machine are compared; and
the current command is changed from the first current command to the second current command when the required drive power exceeds the output drive power and a drive voltage for the required drive power is in a region of the rectangular wave voltage phase control mode.

11. The method according to claim 9, wherein:
a first command voltage and a second command voltage are compared, and the current command from the first current command is changed to the second current command when the second command voltage becomes exceeds the first command voltage, the first command voltage corresponding to a command current produced in performing the first current command and the second command current corresponding to a command current calculated from a command torque, which is based on the required drive power, in performing the second current command.

12. The method according to claim 9, wherein:
the current command is changed from the first current command to the second current command in any one of cases, in which a drive voltage of the rotary electric machine exceeds a predetermined drive voltage threshold, an output voltage of an inverter for driving the rotary electric machine exceeds a predetermined output voltage threshold, and a modulation rate of the output voltage of the inverter exceeds a predetermined modulation rate threshold.

13. The method according to claim 9, wherein:
the current command is changed from the first current command to the second current command, when a torque of the rotary electric machine exceeds a predetermined torque threshold and a rotation speed of the rotary electric machine exceeds a rotation speed threshold.

14. The method according to claim 9, wherein:
current command is changed from the first current command to the second current command, when the control mode is switched over from the sinusoidal wave current control mode to the overmodulation current control mode under a predetermined switching condition.

15. The method according to claim 9, further comprising:
performing a third current command on an intermediate characteristic line predetermined to be between the maximum efficiency characteristic line and the early switching characteristic line on the d-q plane; and
changing the current command from the first current command to the second current command through the third current command.

16. The method according to claim 9, wherein:
the d-q plane is provided for a vector control of the rotary electric machine.

* * * * *